Figures 1, 2:
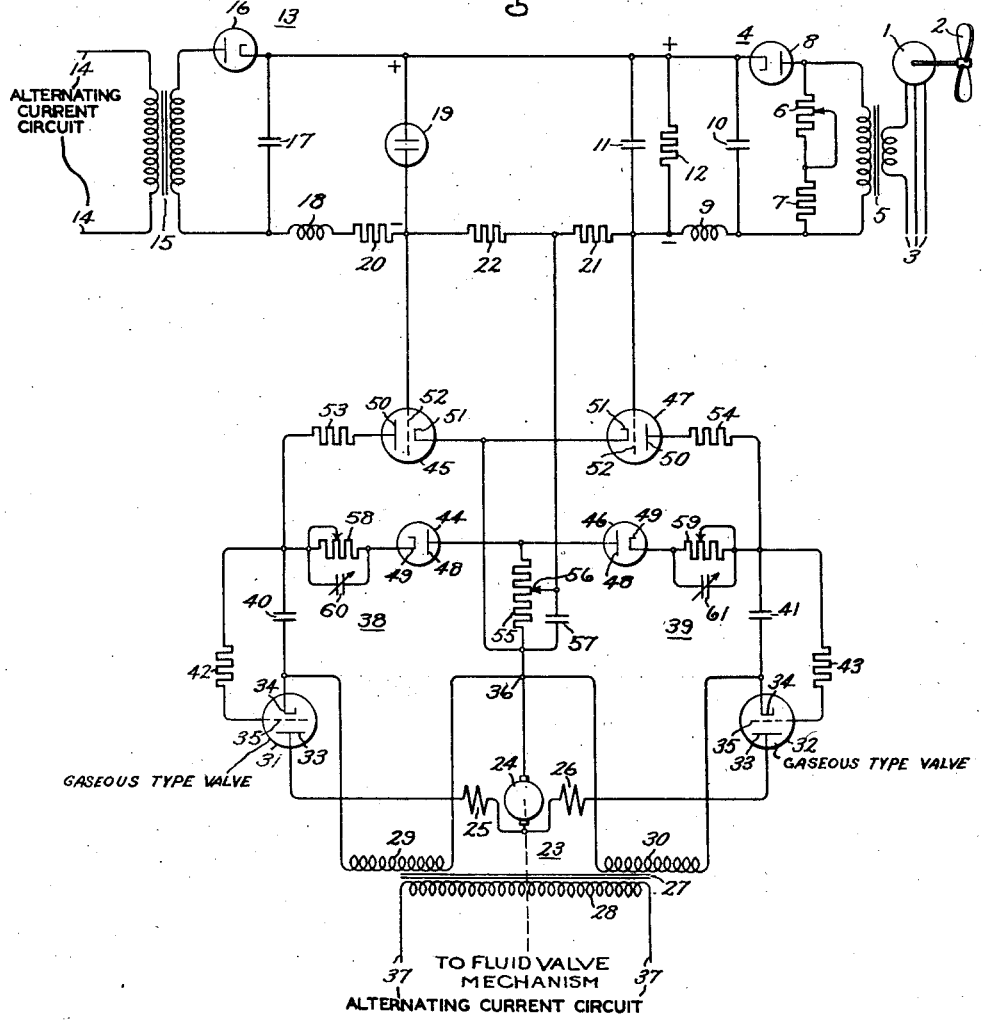

March 31, 1942. E. E. MOYER 2,278,212
ELECTRIC CONTROL SYSTEM
Filed Sept. 28, 1940

Inventor:
Elmo E. Moyer,
by Harry E. Dunham
His Attorney.

Patented Mar. 31, 1942

2,278,212

UNITED STATES PATENT OFFICE 2,278,212

ELECTRIC CONTROL SYSTEM

Elmo E. Moyer, Scotia, N. Y., assignor to General Electric Company, a corporation of New York Application September 28, 1940, Serial No. 358,922

10 Claims. (Cl. 250—27)

My invention relates to electric control systems and more particularly to electric circuits employing an electric valve means.

Electric valve apparatus is being applied rather generally in many industrial processes, such as the control and operation of dynamo-electric machines and in electric translating circuits, for effecting transfer of electrical energy between direct current and alternating current circuits. Coincident with the development of improved circuits for systems of this nature, there has been evidenced a decided need for improved control circuits such as those particularly adapted for producing control voltages to vary or regulate the current conducted by the electric valve means.

It is an object of my invention to provide a new and improved electric valve control circuit.

It is another object of my invention to provide a new and improved electric valve control circuit for producing a resultant voltage having a variable or controllable phase relationship with respect to the voltage of an associated alternating current supply circuit.

It is a further object of my invention to provide a new and improved electric valve control system for controlling or regulating the power transmitted to a load circuit through electric valve translating apparatus, and which comprises, as an element of the control system, an improved circuit which produces a resultant control voltage having an alternating component and a variable unidirectional component.

Briefly stated, in the illustrated embodiment of my invention I provide an electric valve control circuit for controlling the conductivity of electric valve translating apparatus comprising a pair of electric valve means. The control circuit comprises a capacitance, a pair of oppositely poled unidirectional conducting devices which charge the capacitance in opposite directions to establish across the capacitance a resultant voltage having an alternating component of voltage and a unidirectional component of voltage which is variable in magnitude and polarity. The voltage appearing across the capacitance is employed to control the electric valve translating apparatus.

For a better understanding of my invention, reference may be had to the following description taken in connection with the accompanying drawing, and its scope will be pointed out in the appended claims. Fig. 1 diagrammatically illustrates my invention as applied to an electric valve translating system for controlling the operation of a fluid valve mechanism in response to the load applied to a motor which propels the fluid through an associated conduit. Fig. 2 represents certain operating characteristics of the control system shown in Fig. 1.

Referring now to Fig. 1 of the drawing, my invention is there diagrammatically illustrated as applied to a system for controlling a fluid valve mechanism which, in turn, controls the load imposed upon an induction motor 1. The induction motor 1 drives an impelling means, such as fan 2, which is located within a fluid conduit (not shown). The induction motor 1 may be energized from a suitable source 3 of polyphase alternating current. As a means for producing an electrical quantity, such as a voltage, which varies in accordance with the load imposed on the induction motor 1, I provide a control circuit 4 comprising a transformer 5 which is energized in response to the current conducted by one phase of the induction motor 1. A suitable voltage limiting or controlling device, such as a pair of resistances 6 and 7, may be connected across the secondary winding of transformer 5. Where it is desired to produce a unidirectional control voltage which varies in accordance with the load imposed on the induction motor 1, I may employ a suitable unidirectional conducting device 8 for rectifying at least half cycles of one polarity of the output voltage of transformer 5 and suitable filtering means, such as an inductance 9 and capacitances 10 and 11. A suitable impedance element, such as a resistance 12, is connected in circuit 4 so that a unidirectional voltage of variable magnitude appears across the terminals thereof. The magnitude of this unidirectional voltage varies in response to the load imposed on motor 1.

As a source of reference voltage against which the voltage produced by resistance 12 operates, I provide a circuit 13 which may comprise a source of alternating current 14, a transformer 15, a rectifier or unidirectional conducting means 16 and filtering means including a capacitance 17 and an inductance 18. To provide a substantially constant unidirectional voltage, I employ a device having a constant voltage characteristic, such as a glow discharge device or valve 19, which maintains across its terminals a predetermined constant voltage when in a conducting condition. A resistance 20 may be connected in series relation with the glow discharge valve 19.

Interconnected between circuits 4 and 13 I provide a pair of impedance elements, such as resistances 21 and 22, the relative polarities of the voltage thereof being determined by the difference in the voltages produced by circuits 4 and 13, respectively.

I employ any suitable operating mechanism for the fluid valve mechanism such as a direct current motor 23 which comprises an armature 24 and may include a pair of field windings 25 and 26, respectively. The motor 23 is arranged so that the windings 25 and 26 tend to rotate the armature 24 in opposite directions, the direction of rotation depending, of course, upon the resultant or difference in the magnetization produced by these windings. For example, the motor 23 may be arranged so that the fluid valve mechanism is closed when field winding 26 is energized and the fluid valve mechanism is opened or moved in the direction to increase the load imposed on motor 1 when field winding 25 is energized.

To energize selectively field windings 25 and 26, I provide electric valve translating apparatus including a transformer 27 having a primary winding 28 and secondary windings 29 and 30, and a pair of electric valve means 31 and 32. The electric valve means 31 and 32 are preferably of the type employing an ionizable medium, such as a gas or a vapor, and each includes an anode 33, a cathode 34 and a control member 35 which controls or determines the magnitude of the current conducted thereby. The common juncture 36 of secondary windings 29 and 30 is connected to the upper terminal of the armature 24 of direct current control motor 23. The anodes 33 of electric valve means 31 and 32 are connected to field windings 25 and 26, respectively. Due to the connection and polarity of windings 29 and 30 and the relationship of electric valve means 31 and 32, current is transmitted to control windings 25 and 26 during alternate half cycles of the voltage of an alternating current supply circuit 37 which energizes transformer 27.

I provide a pair of improved electric control circuits 38 and 39 which control the conductivities of the electric valve means 31 and 32. Circuits 38 and 39 are selectively responsive to the magnitudes and polarities of the voltages appearing across resistances 21 and 22 which interconnect circuits 4 and 13. Circuits 38 and 39 include capacitances 40 and 41 which are connected to cathodes 34 and control members 35 of electric valve means 31 and 32, respectively. That is, the voltages appearing across the capacitances 40 and 41 are impressed across the cathodes and control members of electric valve means 31 and 32. Suitable current limiting resistances 42 and 43 may be connected in series relation with the control members 35, if desired. As a means for producing across the capacitances 40 and 41 resultant voltages each having an alternating component and a unidirectional component of variable magnitude, I provide pairs of oppositely poled unidirectional conducting devices 44, 45, and 46, 47. Considering the pair of unidirectional conducting devices 44 and 45 relative to capacitance 40, unidirectional conducting device 44 tends to charge capacitance 40 in one direction, and the unidirectional conducting device 45 tends to charge the capacitance 40 in the opposite direction. This is made possible due to the manner in which these devices are poled relative to the capacitance 40 and the secondary winding 29 of transformer 27. In like manner, the unidirectional conducting devices 46 and 47 tend to charge capacitance 41 in the opposite directions. Unidirectional conducting devices 44 and 46 may be of the contact rectifier type or may be of the electronic high vacuum type comprising an anode 48 and a cathode 49. Unidirectional conducting devices 45 and 47 are preferably of the high vacuum type, each comprising an anode 50, a cathode 51 and a control member or grid 52. Cathodes 51 of unidirectional conducting devices 45 and 47 may be connected to the common juncture 36 of secondary windings 29 and 30. Resistances 53 and 54 are connected in series relation with unidirectional conducting devices 45 and 47 and capacitances 40 and 41, respectively, and constitute with devices 45 and 47 resistive branches of the phase shifting or control circuits 38 and 39.

Unidirectional conducting devices 45 and 47 are selectively controlled in response to the voltage appearing across resistances 21 and 22 and consequently are responsive to the difference in potentials or control voltages of circuits 4 and 13. If the voltage of circuit 4 exceeds the voltage appearing across the terminals of glow discharge valve 19, the current conducted by device 45 is increased and the current conducted by device 47 is decreased. Conversely, if the output voltage of circuit 4 is less than the voltage appearing across the terminals of discharge valve 19, the current conducted by device 45 is decreased and the current conducted by device 47 is increased.

As a means for preestablishing or adjusting the relative magnitudes of the currents conducted by the unidirectional conducting devices 45 and 47, I provide a suitable voltage divider 55 having an adjustable connection 56. The voltage divider 55 is connected between the cathodes 51 of unidirectional conducting devices 45 and 47 and anodes 48 of devices 44 and 46. A suitable filtering capacitance 57 may be connected across at least a portion of the voltage divider 55.

I provide in series relation with the unidirectional conducting devices 44 and 46 suitable current controlling means, such as adjustable resistances 58 and 59, which control the amount of current transmitted to the capacitances 40 and 41, respectively, during half cycles of predetermined polarity of the voltage of circuit 37. Unidirectional conducting devices 44 and 46 tend to produce a positive charge on the upper plates of capacitances 40 and 41, and consequently resistances 48 and 49 control the magnitude of the positive charge. Inasmuch as unidirectional conducting devices 45 and 47 are oppositely poled with respect to devices 44 and 46, the former devices control the magnitude of the negative charge. Consequently, the relative currents conducted by members 44, 45 and 46, 47 determine not only the magnitude but the polarity of the resultant unidirectional voltage appearing across capacitances 40 and 41.

It is desirable to effect positive actuation of the fluid valve mechanism and, consequently, it is important to effect rapid and precise changes in the energization of field windings 25 and 26 of motor 23 in order that the motor follow definitely the average variations in control voltage produced by circuit 4. In order that a predetermined minimum energization of field windings 25 and 26 be assured, I provide capacitances 60 and 61 which may be adjustable and which are preferably connected across at least a portion of control resistances 58 and 59, respectively. These capacitances assure a predetermined minimum phase displacement between the resultant voltage impressed on control members 35 of electric valve means 31 and 32 and, hence, assure the transmission of a predetermined minimum average current to the associated field windings 25 and 26, thereby effecting positive actuation or control of motor 23.

The operation of the embodiment of my invention shown in Fig. 1 will be explained by considering the system when it is operating to control the fluid valve mechanism in response to the load of the induction motor 1. As the load imposed on the induction motor 1 varies, the voltage appearing across resistance 12 varies proportionately. As the voltage across resistance 12 varies, the relative polarities of the voltages appearing across resistances 21 and 22 vary to control selectively the currents conducted by unidirectional conducting devices 45 and 47, thereby controlling the magnitude of the unidirectional component of voltage appearing across capacitances 40 and 41. The variation in the unidirectional component of voltage controls the magnitudes of the average currents transmitted by electric valve means 31 and 32 and consequently controls the speed and the direction of rotation of the direct current control motor 23.

Referring more particularly to the operation of the direct current control motor 23, it will be appreciated by those skilled in the art that the average current conducted by the electric valve means 31 and 32 increases as the phase of the resultant voltage impressed on control members 35 is advanced towards the zero point of the positive half cycle of applied anode-cathode voltage, and that the average current is decreased as the phase of the resultant control voltage is retarded. The direction of rotation of the control motor 23 is determined by the difference in the average currents transmitted through field windings 25 and 26 by electric valve means 31 and 32, respectively.

The voltage divider 55 may be adjusted so that the motor 23 is at standstill for a predetermined load imposed on motor 1. Under this condition, the unidirectional conducting devices 45 and 47 may be arranged to be non-conducting or to conduct equal amounts of current, thereby establishing equal unidirectional components of voltage across capacitances 40 and 41. Of course, in this instance the electric valve means 31 and 32 will conduct the same amount of average current to field windings 25 and 26, respectively, and the motor 23 will be maintained at standstill. The magnitude of the resultant voltages impressed on grids 52 of unidirectional conducting devices 45 and 47 is adjustable by means of contact 56 of voltage divider 55.

The resultant voltage impressed on control members 35 of electric valve means 31 and 32 includes an alternating component of voltage and a unidirectional component of voltage. The unidirectional component of voltage varies in magnitude in response to the load on the motor 1 and may be variable in polarity depending upon the setting of the control system. The operating conditions shown in Fig. 2 may be referred to in order to appreciate more fully the operation of circuits 38 and 39. Curve A represents the anode-cathode voltage applied to electric valve means 31 by the secondary winding 29. During the positive half cycle of voltage of this winding, current will flow from the right-hand terminal of winding 29, through voltage divider 55, unidirectional conducting device 44, resistance 58 and capacitance 40, establishing upon the upper plate thereof a positive charge. During the following negative half cycle of voltage produced by secondary winding 29, current will flow through the capacitance 40 in the opposite direction through a circuit including resistance 53, unidirectional conducting device 45 to the right-hand terminal of winding 29. In this manner it will be appreciated that the magnitude and polarity of the unidirectional component of voltage appearing across capacitance 40 is determined by the relative magnitudes of the currents conducted by unidirectional conducting devices 44 and 45. Curve B of Fig. 2 represents the alternating component of voltage appearing across capacitance 40, and lines C and D represent various unidirectional components of voltage appearing across this capacitance. It will be appreciated that as the unidirectional component of voltage varies in magnitude, the alternating component of voltage and hence the resultant voltage impressed on control member 35 of electric valve means 31 is raised and lowered to vary the current conducted by this electric valve means 31. The alternating component of voltage appearing across the capacitance 40 is displaced in the lagging direction by substantially ninety electrical degrees with respect to the voltage of winding 29. The alternating component of voltage is of the same frequency as that of the alternating current circuit 37. Curve B represents the voltage which is impressed on control member 35 for a unidirectional bias corresponding to the position of line C, and curve E represents the resultant voltage impressed on control member 35 for a unidirectional bias corresponding to the position of line D.

If it be assumed that when field winding 25 is energized the fluid valve mechanism is moved toward the open position and that when field winding 26 is energized the fluid valve means is moved towards the closed position, upon an increase of load imposed on induction motor 1 beyond the desired value unidirectional conducting device 45 conducts an increased amount of current, and unidirectional conducting device 47 conducts a decreased amount of current. This variation or change of current conducted by devices 45 and 47 increases the negative unidirectional component of voltage of capacitance 40 and decreases the negative unidirectional biasing voltage appearing across capacitance 41. Consequently, electric valve means 31 conducts a decreased amount of current and electric valve means 32 conducts an increased amount of current, thereby causing the direct current control motor 23 to move the fluid valve mechanism towards the closed position and decreasing the load imposed on induction motor 1. Of course, it will be appreciated that upon a decrease of load of motor 1, the system will respond to operate the motor 23 in a direction which tends to restore the load imposed on motor 1 to the desired value.

It should be further understood that circuits 38 and 39 may be adjusted so that the unidirectional component of voltage appearing across capacitances 40 and 41 may vary in polarity as well as in magnitude. This may be effected by adjustment of resistances 53 and 54 and by means of voltage divider 55.

Capacitances 60 and 61 assure a minimum phase displacement between the resultant control voltages impressed on control members 35 of electric valve means 30 and 31 so that upon changes of load a positive energization of the field windings 25 and 26 may be effected to obtain a definite and positive control of the fluid valve mechanism. The adjustment of capacitances 60 and 61 establishes the angle of this minimum phase displacement.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a source of alternating current, a capacitance, means for establishing across said capacitance a voltage comprising an alternating component of the same frequency as that of said source and a unidirectional component, a pair of oppositely poled unidirectional conducting devices each connected in series relation with said capacitance for charging said capacitance in opposite directions from said source, and means for controlling the relative amounts of current conducted by said unidirectional conducting devices to control the magnitude of said unidirectional component.

2. In combination, an alternating current circuit, a capacitance connected to be energized from said circuit, means for establishing across said capacitance a voltage having an alternating component of the same frequency as that of said circuit and a unidirectional component comprising in series relation with said capacitance a unidirectional conducting device for charging said capacitance in one direction from said alternating current circuit and a second unidirectional conducting device for charging said capacitance in the opposite direction from said alternating current circuit, and means for varying the current conducted by one of said unidirectional conducting devices to vary the magnitude of said unidirectional component.

3. In combination, a source of alternating current, a winding energized from said source, a capacitance connected to be energized from said winding, means for establishing across said capacitance a voltage comprising an alternating component of the same frequency as that of said source and a unidirectional component and including a unidirectional conducting device connected in series relation with said capacitance for charging said capacitance in one direction from said source and a second unidirectional conducting device connected in series relation with said capacitance for charging said capacitance in the opposite direction from said source, and means for controlling the relative amounts of current conducted by said unidirectional conducting devices to control the magnitude and polarity of said unidirectional component.

4. In combination, a source of alternating current, a capacitance, means for establishing across said capacitance an alternating component of voltage of the same frequency as that of said source and a unidirectional component of voltage comprising a unidirectional conducting device for charging said capacitance in one direction from said source and an electronic discharge device for charging said capacitance in the opposite direction from said source, said electronic discharge device having a control member for controlling the current conducted thereby, and means for variably energizing said control member to control the magnitude of said unidirectional component.

5. In combination, a source of alternating current, a capacitance, means for establishing across said capacitance a voltage comprising an alternating component of the same frequency as that of said source and a unidirectional component and including a unidirectional conducting device for charging said capacitance in one direction from said source and an electronic discharge device for charging said capacitance in the opposite direction from said source, means connected in series relation with said unidirectional conducting device for determining the current conducted thereby, and means for controlling the conductivity of said electronic discharge device to control the magnitude of said unidirectional component.

6. In combination, a source of alternating current, a capacitance, means for establishing across said capacitance a voltage comprising an alternating component and a unidirectional component, a pair of oppositely poled unidirectional conducting devices each connected in series relation with said capacitance for charging said capacitance in opposite directions from said source, means for controlling the relative amounts of current conducted by said unidirectional conducting devices to control the magnitude of said unidirectional component, and means for establishing a predetermined minimum phase displacement between the voltage appearing across said capacitance and the voltage of said source.

7. In combination, a source of alternating current, a capacitance, means for establishing across said capacitance a voltage comprising an alternating component and a unidirectional component, a pair of oppositely poled unidirectional conducting devices each connected in series relation with said capacitance for charging said capacitance in opposite directions from said source, means for controlling the relative amount of current conducted by said unidirectional conducting devices to control the magnitudes of said unidirectional component, and means for establishing a predetermined minimum phase displacement between the voltage appearing across said capacitance and the voltage of said source comprising a parallel connected resistance and a capacitance connected in series relation with one of said unidirectional conducting devices and the first mentioned capacitance.

8. In combination, a source for alternating current, a pair of capacitances, means for establishing across said capacitances voltages each having an alternating component and a unidirectional component comprising a transformer having a primary winding connected to said source and having a secondary winding, a pair of circuits for charging said capacitances each comprising a different portion of said secondary winding and each including in series relation with said capacitance a pair of oppositely poled unidirectional conducting devices for charging said capacitances in opposite directions from the associated portions of said secondary winding, and means for controlling the relative amounts of current conducted by the associated pairs of unidirectional conducting devices to determine the magnitude of the unidirectional components of voltages appearing across said capacitances.

9. In combination, a source of alternating current, a load circuit, electric translating apparatus connected between said circuits and comprising an electric valve means having a control member for controlling the current conducted thereby, a capacitance, means for connecting said capacitance to said control member, means for establishing across said capacitance a voltage having an alternating component of the same frequency as that of said source and a unidirectional component and including a pair of oppositely poled unidirectional conducting devices for charging said capacitance in opposite directions from said source, and means for controlling the relative magnitudes of the currents conducted by said pair of unidirectional conducting devices to control the magnitude of said unidirectional component.

10. In combination, an alternating current supply circuit, a load circuit, electric translating apparatus connected between said circuits and comprising an electric valve means having a control member, a capacitance, means for impressing the voltage of said capacitance on said control member, means for establishing across said capacitance a voltage having an alternating component of the same frequency as that of said supply circuit and a unidirectional component and including a unidirectional conducting device connected in series relation with said capacitance for charging said capacitance in one direction from said supply circuit, an electronic discharge device for charging said capacitance in the opposite direction from said supply circuit, said electronic discharge device having a grid for controlling the current conducted thereby, and means for variably energizing said grid to control the magnitude of said unidirectional component.

ELMO E. MOYER.